US010946861B2

(12) United States Patent
Sekizawa et al.

(10) Patent No.: US 10,946,861 B2
(45) Date of Patent: Mar. 16, 2021

(54) HYDROPLANING DETERMINATION DEVICE

(71) Applicant: DENSO CORPORATION, Kariya (JP)

(72) Inventors: Takatoshi Sekizawa, Kariya (JP); Masashi Mori, Kariya (JP); Nobuya Watabe, Kariya (JP); Hideyuki Ikemoto, Kariya (JP); Yoichiro Suzuki, Nisshin (JP)

(73) Assignee: DENSO CORPORATION, Kariya (JP)

(*) Notice: Subject to any disclaimer, the term of this patent is extended or adjusted under 35 U.S.C. 154(b) by 115 days.

(21) Appl. No.: 16/083,912

(22) PCT Filed: Jan. 12, 2017

(86) PCT No.: PCT/JP2017/000803
§ 371 (c)(1),
(2) Date: Sep. 11, 2018

(87) PCT Pub. No.: WO2017/159012
PCT Pub. Date: Sep. 21, 2017

(65) Prior Publication Data
US 2019/0077408 A1 Mar. 14, 2019

(30) Foreign Application Priority Data
Mar. 17, 2016 (JP) .............................. JP2016-054108

(51) Int. Cl.
*B60W 40/06* (2012.01)
*B60T 8/172* (2006.01)
(Continued)

(52) U.S. Cl.
CPC ............. *B60W 40/06* (2013.01); *B60C 19/00* (2013.01); *B60C 23/00* (2013.01); *B60T 8/172* (2013.01);
(Continued)

(58) Field of Classification Search
CPC .. B60W 40/06; B60W 40/12; B60W 2400/00; B60W 2422/70;
(Continued)

(56) References Cited

U.S. PATENT DOCUMENTS

2005/0085987 A1* 4/2005 Yokota ................ B60C 23/0477
701/80
2011/0160977 A1* 6/2011 Matsuda ................. B60T 8/175
701/85
(Continued)

FOREIGN PATENT DOCUMENTS

JP 4263400 B2 5/2009
JP 2011111134 A 6/2011
(Continued)

*Primary Examiner* — Aaron L Troost
(74) *Attorney, Agent, or Firm* — Harness, Dickey & Pierce, P.L.C.

(57) ABSTRACT

A hydroplaning determination device that determines occurrence of a hydroplaning phenomenon in a vehicle includes a tire mount sensor including a vibration detection unit, a signal process unit and a transmission unit, and a vehicle body system including a receiver, a condition determination unit and a hydroplaning determination unit. The vibration detection unit is attached to a rear surface of a tire provided in a vehicle and outputs a detection signal according to a magnitude of vibration of the tire. The signal process unit generates a vibration data based on the detection signal. The hydroplaning determination unit determines, based on the vibration data, whether a hydroplaning phenomenon has occurred when the condition determination unit determines that a road surface condition is a wet condition in which a water film exists between the tire and a road surface.

9 Claims, 5 Drawing Sheets (51) Int. Cl.
*B60T 8/173* (2006.01)
*B60C 23/00* (2006.01)
*B60C 19/00* (2006.01)
*G01M 17/02* (2006.01)
*B60W 40/12* (2012.01)

(52) U.S. Cl.
CPC ............ *B60T 8/173* (2013.01); *B60T 8/1725* (2013.01); *B60W 40/12* (2013.01); *G01M 17/02* (2013.01); *B60C 2019/004* (2013.01); *B60C 2019/007* (2013.01); *B60T 2210/13* (2013.01); *B60W 2400/00* (2013.01); *B60W 2422/70* (2013.01); *B60W 2510/0638* (2013.01); *B60W 2530/20* (2013.01)

(58) Field of Classification Search
CPC ...... B60W 2510/0638; B60W 2530/20; B60C 19/00; B60C 23/00; B60C 2019/004; B60C 2019/007; B60T 8/172; B60T 8/1725; B60T 8/173; B60T 2210/13; G01M 17/02
See application file for complete search history.

(56) References Cited

U.S. PATENT DOCUMENTS

2013/0116972 A1* 5/2013 Hanatsuka ............. G01B 17/08
702/167
2016/0368502 A1* 12/2016 Suzuki ................. B60W 40/06

FOREIGN PATENT DOCUMENTS

| JP | 2011242303 A | | 12/2011 |
|---|---|---|---|
| JP | 2012086747 A | * | 5/2012 |
| JP | 5297369 B2 | | 9/2013 |
| JP | 2015174638 A | | 10/2015 |

* cited by examiner

HYDROPLANING DETERMINATION DEVICE

CROSS REFERENCE TO RELATED APPLICATIONS

This application is a U.S. National Phase Application under 35 U.S.C. 371 of International Application No. PCT/JP2017/000803 filed on Jan. 12, 2017 and published in Japanese as WO/2017/159012 A1 on Sep. 21, 2017. This application is based on and claims the benefit of priority from Japanese Patent Application No. 2016 5'11082016-054108 filed on Mar. 17, 2016. The entire disclosures of all of the above applications are incorporated herein by reference.

TECHNICAL FIELD

The present disclosure relates to a hydroplaning determination device that determines occurrence of a hydroplaning phenomenon in a vehicle.

BACKGROUND ART

Conventionally, in Patent Literature 1, a road surface condition estimation system has been proposed. The road surface condition estimation system includes an acceleration sensor on a rear surface of a tire tread. The road surface condition estimation system detects a vibration applied to the tire by the acceleration sensor and transmits a detection result of the vibration to a vehicle body side. In this road surface condition estimation system, the road surface condition is detected based on a fact that a vibration waveform when a portion of the tire tread corresponding to a position of the acceleration sensor contacts the road surface with the rotation of the tire changes depending on the road surface condition. Specifically, road surface conditions such as deep wet road, sherbet-like snow, snow cover road, frozen road, shallow wet road are detected based on the vibration waveform of the acceleration sensor.

PRIOR ART LITERATURE

Patent Literature

Patent Literature 1: JP 2011-242303 A

SUMMARY OF INVENTION

In the case where the road surface condition is a wet road, a hydroplaning phenomenon may occur in which the tire floats on water when the vehicle speed increases. Since the stability of the vehicle is impaired by the occurrence of the hydroplaning phenomenon, it is desired to be capable of detecting the occurrence. Conventionally, however, the road surface condition of the road surface on which the vehicle is traveling is only detected, and it is impossible to determine the occurrence of the hydroplaning phenomenon.

It is an object of the present disclosure to provide a hydroplaning determination device capable of determining occurrence of a hydroplaning phenomenon in a vehicle.

According to an aspect of the present disclosure, a hydroplaning determination device includes a tire mount sensor and a vehicle body system. The tire mount sensor includes a vibration detection unit that is attached to a rear surface of a tire provided in the vehicle and outputs a detection signal according to a magnitude of vibration of the tire. The tire mount sensor includes a signal process unit that generates a vibration data based on the detection signal of the vibration detection unit. The tire mount sensor includes a transmission unit that transmits the vibration data. The vehicle body system includes a receiver that is disposed in a vehicle body area and receives the vibration data transmitted from the transmission unit. The vehicle body system further includes a condition determination unit that determines, based on the vibration data, whether a road surface condition is a wet condition in which a water film exists between the tire and a road surface. The vehicle body system further includes a hydroplaning determination unit that determines, based on the vibration data, whether a hydroplaning phenomenon has occurred when the condition determination unit determines that the road surface condition is the wet condition.

As described above, when the road surface condition is determined as the wet condition based on the vibration data of the tire mount sensor, the determination whether the hydroplaning phenomenon has occurred is performed based on the vibration data. Specifically, whether the hydroplaning phenomenon has occurred is determined based on a fact that a waveform of the detection signal of the vibration detection unit at a contact start time and a contact end time of the tire mount sensor varies according to the occurrence of the hydroplaning phenomenon. As a result, occurrence of a hydroplaning phenomenon in a vehicle can be determined.

DESCRIPTION OF EMBODIMENTS

Hereinafter, embodiments of the present disclosure will be described with reference to the drawings. In the following embodiments, the same or equivalent parts are denoted by the same reference numerals.

First Embodiment

A hydroplaning determination device according to the present embodiment will be described with reference to FIG. 1 to FIG. 8. The hydroplaning determination device according to the present embodiment estimates the road surface condition during traveling based on vibration on the ground contact surface of the tire provided for each wheel of the vehicle and determines the occurrence of the hydroplaning phenomenon based on the estimation.

Figure 1:
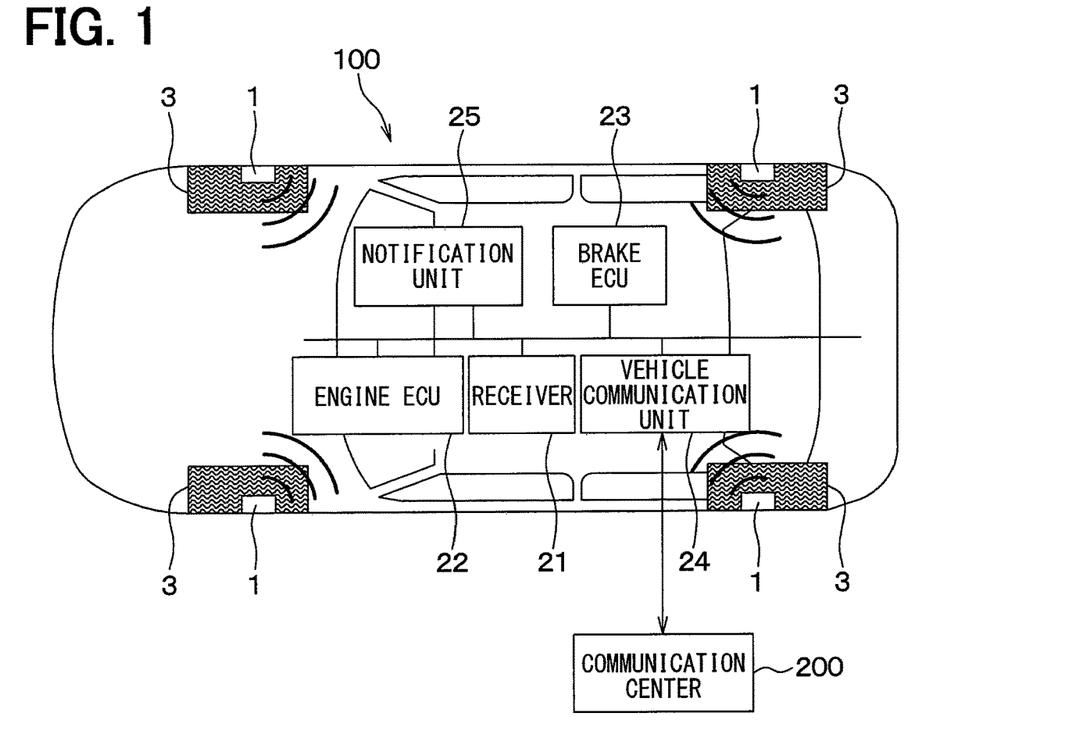
FIG. 1 is a diagram showing a block configuration of a hydroplaning determination device in a vehicle mounted state according to a first embodiment.
Figure 2:
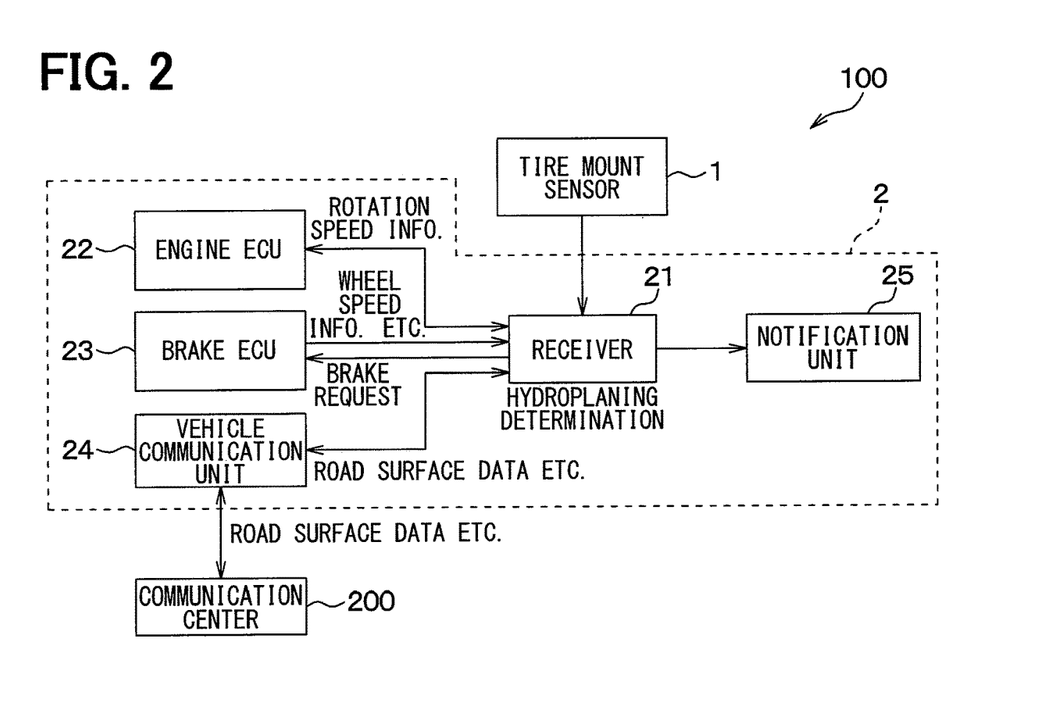
FIG. 2 is a block diagram showing information transmission in the hydroplaning determination device.

As shown in FIG. 1 and FIG. 2, a hydroplaning determination device 100 has a tire mount sensor 1 provided in a wheel area, and a vehicle body system 2 including portions provided in a vehicle body area. The vehicle body system 2 includes a receiver 21, an electronic control unit for engine control (hereinafter referred to as an engine ECU) 22, an electronic control unit for brake control (hereinafter referred to as a brake ECU) 23, a vehicle communication unit 24, a notification unit 25 and the like.

In the hydroplaning determination device 100, vibration data applied to a tire 3 is acquired by the tire mount sensor 1, and the vibration data is transmitted to the receiver 21. Then, in the receiver 21, the road surface condition is determined based on the received vibration data or various kinds of information acquired from the engine ECU 22 and the brake ECU 23, and a hydroplaning determination is performed to determine whether a hydroplaning phenomenon has occurred.

In the present embodiment, when the receiver 21 determines that the hydroplaning phenomenon has occurred, the hydroplaning determination device 100 notifies the notification unit 25 of the fact that the hydroplaning phenomenon has occurred and causes the notification unit 25 to notify the fact. The hydroplaning determination device 100 performs a control for improving the stability of the vehicle by outputting a control signal for performing vehicle control to the engine ECU 22 and the brake ECU 23 from the receiver 21 when the hydroplaning phenomenon occurs.

Further, the receiver 21 notifies the vehicle communication unit 24 of the road surface data indicating the determination result of the road surface condition and the data indicating that the hydroplaning phenomenon has occurred, and sends the data to the communication center 200 through the vehicle communication unit 24. Conversely, the hydroplaning determination device 100 acquires road surface data and information indicating a place where the hydroplaning phenomenon has occurred from the communication center 200 via the vehicle communication unit 24.

Specifically, the tire mount sensor 1 and the receiver 21 are configured as follows.

Figure 3:
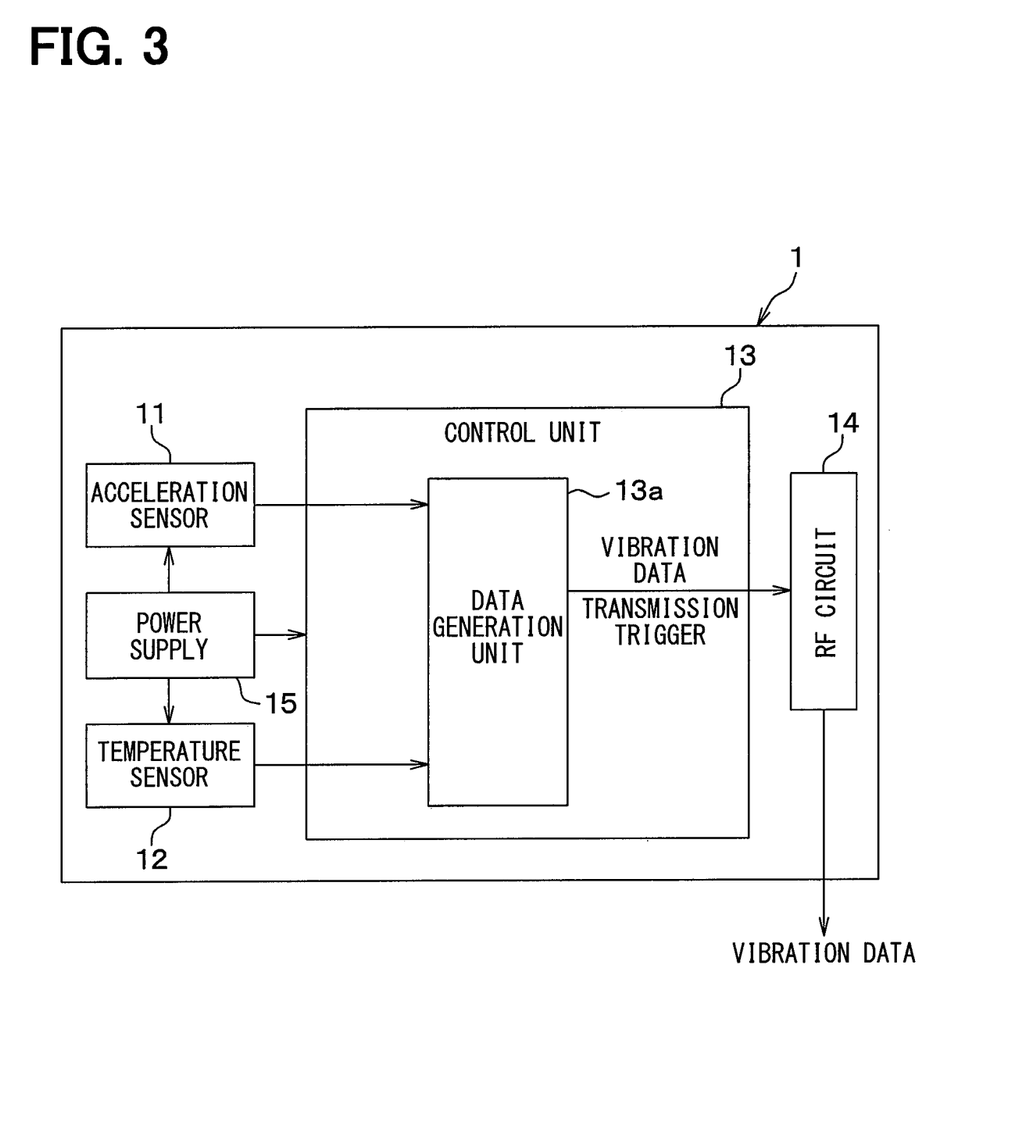
FIG. 3 is a block diagram of a tire mount sensor.
Figure 4:
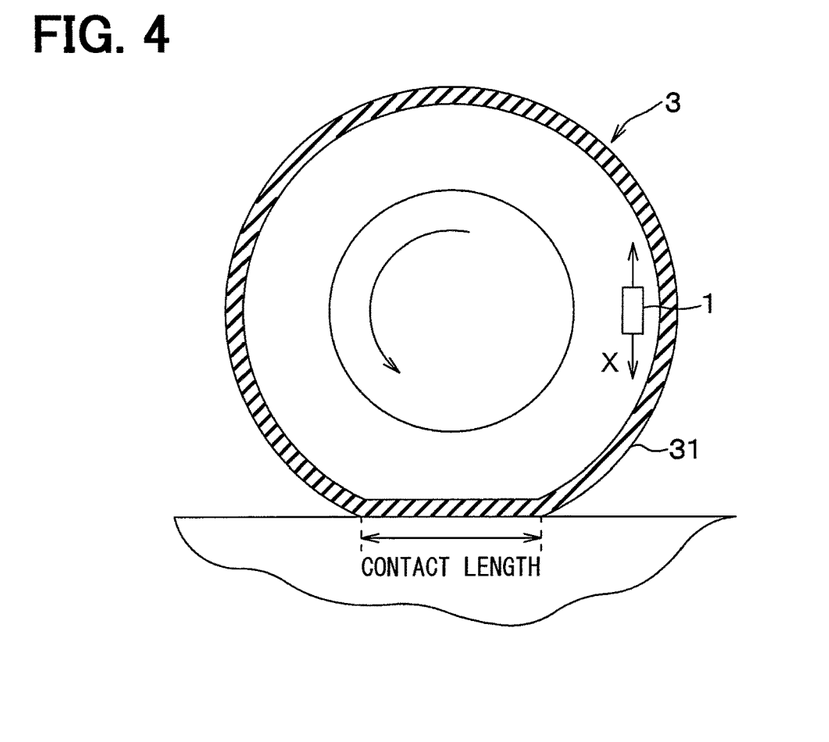
FIG. 4 is a schematic cross-sectional view of a tire to which the tire mount sensor is attached.

As shown in FIG. 3, the tire mount sensor 1 includes an acceleration sensor 11, a temperature sensor 12, a control unit 13, an RF circuit 14, and a power supply 15. As shown in FIG. 4, the tire mount sensor 1 is disposed in a rear side area of a tread 31 of the tire 3.

The acceleration sensor 11 constitutes a vibration detection unit that detects vibration applied to the tire. For example, the acceleration sensor 11 outputs a detection signal of acceleration. The detection signal corresponds to vibration in a direction in contact with a circular orbit drawn by the tire mount sensor 1 when the tire 3 rotates. That is, the detection signal corresponds to vibration in a tire tangential direction shown by an arrow X in FIG. 4.

The temperature sensor 12 outputs a detection signal corresponding to the temperature. The temperature sensor 12 measures the temperature of the traveling road surface by detecting the temperature of the position of the tire 3 to which the tire mount sensor 1 is attached.

The control unit 13 corresponds to a signal processing unit. The control unit 13 uses the detection signal of the acceleration sensor 11 as a detection signal representing the vibration in the tire tangential direction, and generates vibration data from the detection signal itself or by extracting necessary portions from the detection signal. Then, the control unit 13 transmits the vibration data to the RF circuit 14. In the following description, a time point when the portion of the tread 31 of the tire 3 corresponding to the position of the acceleration sensor 11 contacts the road surface is referred to as a contact start time. A time point when the portion of the tread 31 is separated from the road surface is referred to as a contact end time. A time period from the contact start time to the contact end time, that is, a time period while which the portion of the tread 31 of the tire 3 corresponding to the position of the acceleration sensor 11 contacts the road surface is referred to as a contact period. In the present embodiment, the position of the acceleration sensor 11 corresponds to the position of the tire mount sensor 1. For this reason, the contact start time, the contact end time, and the contact period respectively correspond to the contact start time, the contact end time, and the contact period of the portion of the tread 31 of the tire 3 corresponding to the position of the tire mount sensor 1.

The detection signal of the acceleration sensor 11, specifically, the change in the output voltage of the acceleration sensor 11 and the high frequency component included in the detection signal represent the road surface condition. In addition, the detection signal of the acceleration sensor 11 changes depending on whether a hydroplaning phenomenon occurs. Therefore, the control unit 13 transmits the detection signal of the acceleration sensor 11 to the RF circuit 14 as vibration data indicating the road surface condition and the occurrence of the hydroplaning phenomenon. Alternatively, as will be described later, the control unit 13 may extract the peak of the change in the detection signal, extract the high frequency component from the detection signal, and use the extraction result as vibration data. By using the extracted data as the vibration data, data size is reduced.

In the present embodiment, since the temperature of the traveling road surface (hereinafter referred to as a road surface temperature) is measured by the temperature sensor 12, the control unit 13 adds data concerning the road surface temperature in the vibration data and transmits the vibration data to the RF circuit 14.

In this manner, the control unit 13 generates the vibration data based on the detection signal of the acceleration sensor 11, and transmits the vibration data to the RF circuit 14. As a result, the vibration data is transmitted to the receiver 21 through the RF circuit 14.

Specifically, the control unit 13 is configured by a well-known microcomputer including a CPU, a ROM, a RAM, an I/O and the like. The control unit 13 executes the above-described processing according to a program stored in a ROM or the like. The control unit 13 includes a data generation unit 13a as a functional unit that executes these processes.

Figure 5:
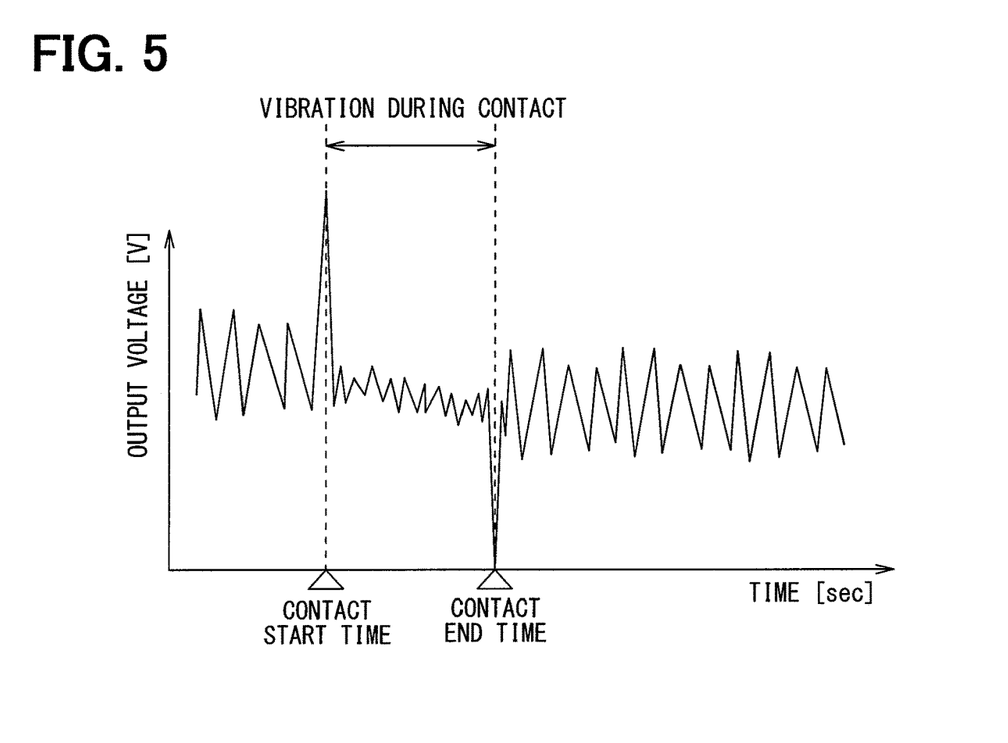
FIG. 5 is a diagram showing an output voltage waveform of an acceleration sensor during tire rotation.

For example, the output voltage waveform of the acceleration sensor 11 during the tire rotation is shown in FIG. 5. As shown in FIG. 5, the output voltage of the acceleration sensor 11 has a maximum value at the contact start time when the portion of the tread 31 of the tire 3 corresponding to the position of the acceleration sensor 11 starts to contact the ground with the rotation of the tire 3. The output voltage of the acceleration sensor 11 at the contact start time at which the output voltage has the maximum value is referred to as a first peak value. As shown in FIG. 5, the output voltage of the acceleration sensor 11 has a minimum value at the contact end time when the portion of the tread 31 of the tire 3 corresponding to the position of the acceleration sensor 11 is changed from a state contacting the ground to a state not contacting the ground with the rotation of the tire 3. The output voltage of the acceleration sensor 11 at the contact end time at which the output voltage has the minimum value is referred to as a second peak value. The first peak value and the second peak value appear as peaks in the reverse direction with respect to the average value of the output voltage of the acceleration sensor 11 at times other than the peak time. However, the absolute values of the peak heights are substantially similar to each other.

The reason why the output voltage of the acceleration sensor 11 has peak values at the above timing is as follows. When the portion of the tread 31 corresponding to the position of the acceleration sensor 11 contacts the ground with the rotation of the tire 3, a portion of the tire 3, which had a substantially cylindrical surface, is pressed to be deformed into a flat shape in the vicinity of the acceleration sensor 11. Upon receiving the impact at this time, the output voltage of the acceleration sensor 11 has the first peak value. When the portion of the tread 31 corresponding to the position of the acceleration sensor 11 is separated from the ground with the rotation of the tire 3, the pressing of the portion of the tire 3 is released in the vicinity of the acceleration sensor 11, and the flat shape of the portion of the tire 3 returns to the substantially cylindrical shape. Upon receiving the impact when the shape of the tire 3 returns, the output voltage of the acceleration sensor 11 has the second peak value. In this way, the output voltage of the acceleration sensor 11 has the first peak value and the second peak value at the contact start time and the contact end time, respectively. In addition, since the direction of the impact when the tire 3 is pressed and the direction of the impact when the pressing of the tire 3 is released are opposite directions, the signs of the output voltages are in the opposite directions.

The data generation unit 13a generates vibration data by directly using the output voltage of the acceleration sensor 11 or by extracting a necessary part from the output voltage of the acceleration sensor 11. When extracting the necessary part from the output voltage of the acceleration sensor 11, the vibration data is generated from, for example, the first peak value, the second peak value, the high frequency level in the contact period, and the high frequency level in the predetermined region before the first peak value.

Further, as described above, in the present embodiment, the temperature of the traveling road surface is measured by the temperature sensor 12. Based on this, the data generation unit 13a obtains the road surface temperature by inputting the detection signal of the temperature sensor 12, and adds the data concerning the road surface temperature in the vibration data, and transmits the vibration data to the RF circuit 14.

Since the timing at which the output voltage of the acceleration sensor 11 has the second peak value is the contact end time of the acceleration sensor 11, the data generation unit 13a sends a transmission trigger to the RF circuit 14 at this timing. As a result, the RF circuit 14 transmits the vibration data created by the data generation unit 13a to the receiver 21. Accordingly, since the data transmission by the RF circuit 14 is not always performed, but only at the contact end time of the acceleration sensor 11, the power consumption can be reduced.

The RF circuit 14 constitutes a transmission unit that transmits the vibration data transmitted from the data generation unit 13a to the receiver 21. Communication between the RF circuit 14 and the receiver 21 can be implemented by a known short-distance wireless communication technology such as Bluetooth (registered trademark), for example. Although the timing of transmitting the vibration data is arbitrary, as described above, in the present embodiment, when the transmission trigger is sent from the data generation unit 13a at the contact end time of the acceleration sensor 11, the vibration data is transmitted from the RF circuit 14. Accordingly, since the data transmission by the RF circuit 14 is not always performed, but only at the contact end time of the acceleration sensor 11, the power consumption can be reduced.

The vibration data is sent together with the unique identification information (hereinafter referred to as ID information) of the wheels which are provided in advance for each tire 3 of the vehicle. The position of each wheel can be identified by a well-known wheel position detecting device that detects where the wheel is mounted on the vehicle. By transmitting the vibration data together with the ID information to the receiver 21, it is possible to determine the wheel to which the vibration data corresponds.

On the other hand, the receiver 21 receives the vibration data transmitted from the tire mount sensor 1, and based on the vibration data, determines whether the road surface condition is a wet condition in which a water film exists between the tire 3 and the road surface, or determines whether the hydroplaning phenomenon occurs. When the receiver 21 determines that the hydroplaning phenomenon has occurred, the receiver 21 transmits a signal indicating that fact to the notification unit 25, and notifies the driver of the occurrence of the hydroplaning phenomenon by the notification of the notification unit 25. When the receiver 21 determines that the hydroplaning phenomenon has occurred, the receiver 21 transmits a control signal to the engine ECU 22 and the brake ECU 23 as necessary. As a result, the vehicle motion control is executed to improve the stability. For example, the engine ECU 22 reduces the engine output and the brake ECU 23 reduces the braking force. Further, the receiver 21 sends the road surface data indicating the road surface condition and the data indicating that the hydroplaning phenomenon has occurred to the communication center 200 through the vehicle communication unit 24. Details of the processing executed by the receiver 21 will be described later.

The engine ECU 22 constitutes a driving force control device that controls the engine output by adjusting the engine speed and the fuel injection amount. The engine ECU 22 deals with information about the engine speed. Information of the engine speed is transmitted from the engine ECU 22 to the receiver 21. When the receiver 21 determines that the hydroplaning phenomenon has occurred, a control signal is sent to the engine ECU 22, and control for lowering the engine output is performed by controlling the engine speed or the like.

The brake ECU 23 constitutes a brake control device that performs various brake controls. By controlling the actuator for controlling the brake fluid pressure, the brake ECU 23 can automatically generate the wheel cylinder pressure to generate a braking force or decrease the wheel cylinder pressure to lower the braking force. In addition, the brake ECU 23 can independently control the braking force of each wheel. Therefore, when a control signal is transmitted from the receiver 21 when it is determined that a hydroplaning phenomenon has occurred, the brake ECU 23 can lower the braking force of the wheel where the hydroplaning phenomenon occurred, based on the control signal. In addition, the brake ECU 23 performs wheel speed calculation, vehicle speed calculation, and the like based on a detection signal of a wheel speed sensor (not shown) or the like. The brake ECU 23 transmits the calculation result to the receiver 21 as wheel speed information and vehicle speed information.

The vehicle communication unit 24 is capable of performing road-vehicle communication, and exchanges information with the communication center 200 via a communication system (not shown) installed on a road or the like, for example. In the present embodiment, the vehicle communication unit 24 sends the road surface data indicating the road surface condition acquired by the receiver 21, and the data indicating that the hydroplaning phenomenon has occurred to the communication center 200 together with the current position information of the subject vehicle. The vehicle communication unit 24 receives the road surface data and the data concerning the occurrence of the hydroplaning phenomenon with respect to the road on which the vehicle is scheduled to travel from the communication center 200. As will be described later, the communication center 200 acquires road surface data and data concerning the occurrence of the hydroplaning phenomenon from a large number of vehicles equipped with the hydroplaning determination device 100, and maps the data, that is, manages the data by coordinating the data with roads in the map data. Therefore, the hydroplaning determination device 100 provides the road surface data and the data indicating that the hydroplaning phenomenon has occurred to the communication center 200, and conversely, acquires the data managed by the communication center 200 with respect to the road scheduled to travel. Accordingly, through the communication center 200, it is possible to share information concerning the road surface condition and the occurrence of the hydroplaning phenomenon among a large number of vehicles.

The notification unit 25 includes, for example, a meter display device, and notifies the driver of the occurrence of the hydroplaning phenomenon in the vehicle. In the case where the notification unit 25 includes the meter display device, the notification unit 25 is disposed in a place visible to the driver while driving the vehicle, for example, in the instrument panel of the vehicle. Then, when the control signal indicating that the hydroplaning phenomenon has occurred is transmitted from the receiver 21, the notification unit 25 visually notifies the danger to the driver by performing display in a manner that the driver can figure out the contents.

The notification unit 25 may include a buzzer, a voice guidance device, or the like. In that case, the notification unit 25 can audibly notify the driver of the occurrence of the hydroplaning phenomenon by the buzzer sound or the voice guidance. Although the meter display device has been exemplified as the notification unit 25 providing visual notification, the notification unit 25 may be configured by a display device that displays information such as a head up display.

As described above, the hydroplaning determination device 100 according to the present embodiment is configured. For example, each part of the vehicle body system 2 is connected through an in-vehicle LAN (abbreviation of Local Area Network) such as CAN (abbreviation of Controller Area Network). Therefore, each part can communicate information with each other through the in-vehicle LAN.

The communication center 200 communicates with the hydroplaning determination devices 100 provided in a large number of vehicles, collects data concerning the road surface data and the occurrence of the hydroplaning phenomenon, and provides collected data to the vehicles. The communication center 200 may directly communicate with the vehicle communication unit 24. Alternatively, the communication center 200 can communicate with the vehicle communication unit 24 through a communication system installed at various places such as a road.

In the present embodiment, the communication center 200 collects road surface data and data indicating that a hydroplaning phenomenon has occurred for each location of road in the map data, and manages the data as a database. Since the road surface condition changes from moment to moment, the communication center 200 communicates with the hydroplaning determination device 100 of each of the large number of vehicles at any time to update the road surface data and the data indicating that the hydroplaning phenomenon has occurred.

In the communication center 200, information is also obtained from other source than the hydroplaning determination device 100, and by using the information, the road surface data and the like are corrected as necessary. For example, the communication center 200 also collects weather information and the like, corrects the road surface data and the like based on the weather information, and updates to more reliable road surface data and the like. Specifically, the communication center 200 acquires information concerning precipitation amount, snow accumulation amount, frozen road surface as weather information, and updates the wet road surface, the snow cover road surface and the frozen road surface to corresponding road surface data and the like. As such, the communication center 200 successively stores more accurate road surface data.

The communication center 200 provides the data managed in the database to the vehicle having the hydroplaning determination device 100. At this time, since the communication center 200 collects road surface data and the like from the large number of vehicles to create the database, each vehicle not only acquires road surface data of the current position of the subject vehicle, but also acquires road surface data of the road scheduled to travel.

Figure 6:
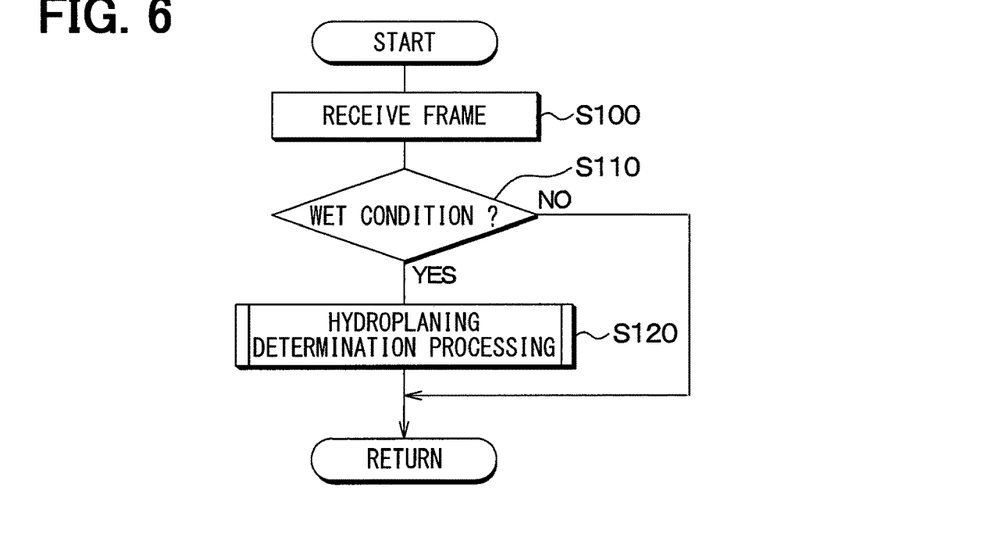
FIG. 6 is a flowchart showing details of a wet determination process.
Figure 7:
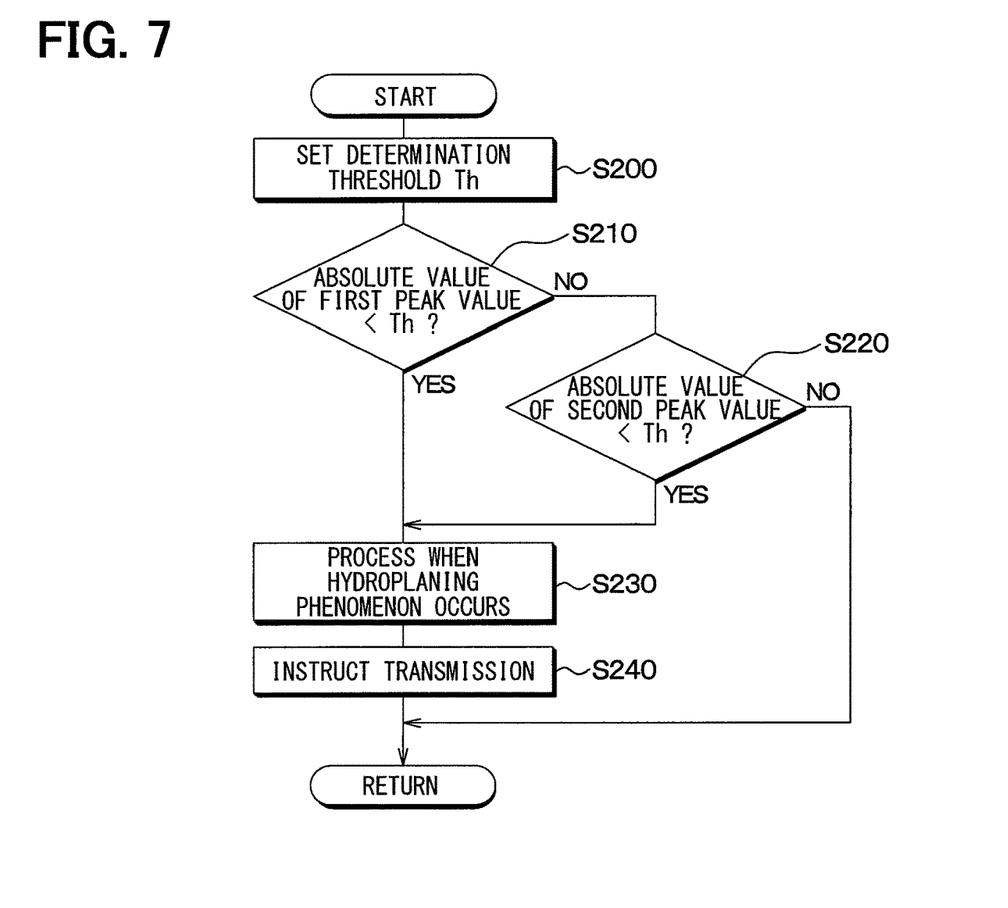
FIG. 7 is a flowchart showing details of a hydroplaning determination process.

Next, an operation of the hydroplaning determination device 100 according to the present embodiment will be described with reference to FIG. 6 and FIG. 7. FIG. 6 and FIG. 7 are flowcharts showing details of the wet determination processing and the hydroplaning determination processing executed by the receiver 21, more specifically, the control unit 13. The wet determination process shown in FIG. 6 is executed at predetermined control intervals, for example, when an ignition switch (not shown) is turned on. The hydroplaning determination process shown in FIG. 7 is executed when the wet road surface is determined in the wet determination process.

When the vehicle travels, the vibration data corresponding to the running of the vehicle is transmitted from the tire mount sensor 1 provided for each wheel. That is, in the tire mount sensor 1 of each wheel, the control unit 13 generates the vibration data by directly using the detection signal of the acceleration sensor 11, or by extracting necessary parts. Then, the control unit 13 transmits the frame storing the vibration data to the receiver 21 through the RF circuit 14.

Based on this, the receiver 21 provided in the vehicle body area exchanges the vibration data shown in FIG. 6. Specifically, by receiving the frame in step S100, the vibration data is received from the tire mount sensor 1. Then, in step S110, it is determined, from the received vibration data, whether the road surface condition is a wet condition. A unit of the receiver 21 that determines whether the road surface condition is a wet condition constitutes a condition determination unit.

Specifically, since the vibration data varies according to the road surface condition, the receiver 21 determines, from the vibration data, whether the road surface condition is the wet condition. For example, as disclosed in Patent Literature 1, the road surface condition can be detected from the magnitude of the high-frequency level in the predetermined region before the first peak value included in the vibration data. That is, based on the band value obtained by extracting the magnitude of the high-frequency level in the predetermined region before the first peak value with the band-pass filter, the road surface temperature detected by the temperature sensor 12, and the like, it is determined that the road surface condition is the wet condition. Since this method is a well-known method disclosed in Patent Literature 1, a description thereof will be omitted.

Various methods can be applied to the determination that the road surface condition is the wet condition, and any method may be applied to the determination of the wet condition. For example, as shown in JP 2015-174638 A, the road surface condition can be determined based on the high frequency level of the detection signal of the acceleration sensor 11 in the contact period.

When the receiver 21 determines that the road surface condition is the wet condition, the process proceeds to step S120 to execute a hydroplaning determination process for determining whether a hydroplaning phenomenon has occurred. The unit of the receiver 21 that executes the hydroplaning determination process constitutes a hydroplaning determination unit. FIG. 7 shows details of this hydroplaning determination process.

The hydroplaning phenomenon is a phenomenon in which the road surface condition is the wet condition, the tire floats on water, and the stability of the vehicle is degraded. When the hydroplaning phenomenon occurs, the vibration applied from the road surface to the tire 3 is decreased, and the absolute values of the first peak value and the second peak value in the detection signal of the acceleration sensor 11 are decreased compared to those when the hydroplaning phenomenon does not occur. Based on this, the occurrence of the hydroplaning phenomenon is determined by comparing at least one of the first peak value and the second peak value included in the vibration data sent from the tire mount sensor 1 with the determination threshold Th. However, the absolute values of the first peak value and the second peak value vary according to the vehicle speed, and increase as the vehicle speed increases. Therefore, the determination threshold Th is set corresponding to the vehicle speed.

Figure 8:
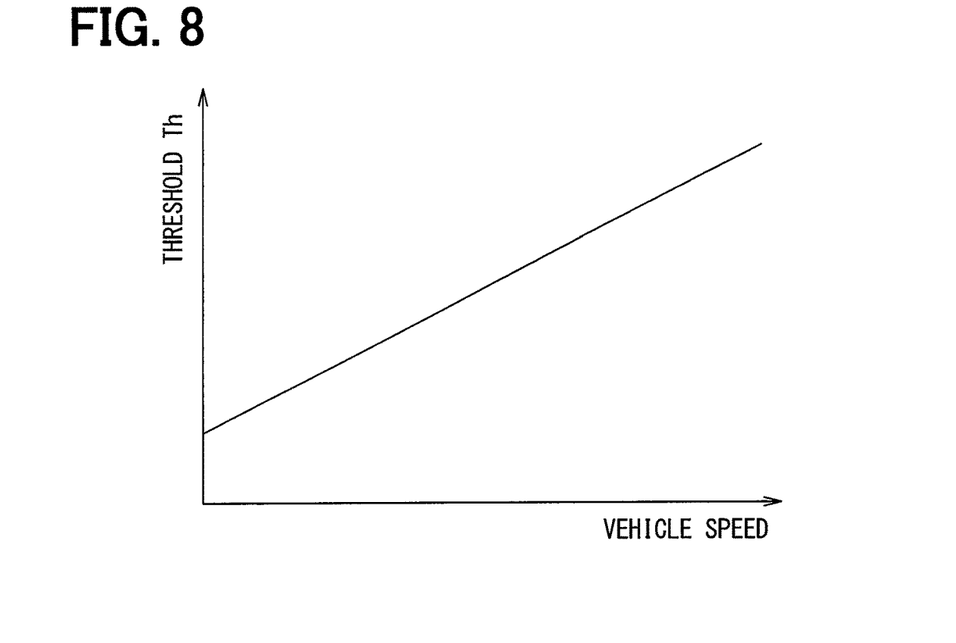
FIG. 8 is a diagram showing a relationship between a vehicle speed and a determination threshold Th.

For example, the receiver 21 stores a map as shown in FIG. 8 or a relational expression showing the relationship between the vehicle speed and the determination threshold Th. The relationship may be obtained as a default value in advance based on experiments or the like, or may be obtained by sequentially accumulating and learning the relation of the first peak value and the second peak value with the vehicle speed during traveling. Using the relationship, the receiver 21 sets the determination threshold Th corresponding to the vehicle speed based on the vehicle speed indicated by the vehicle speed information transmitted from the brake ECU 23 in step S200. Then, in step S210, it is determined whether the absolute value of the first peak value included in the vibration data is smaller than the determination threshold Th. In step S220, it is determined whether the absolute value of the second peak value included in the vibration data is smaller than the determination threshold Th.

In case an affirmative determination is made in either one of steps S210 and S220, the process proceeds to step S230 to determine that the hydroplaning phenomenon has occurred. As a process when the hydroplaning phenomenon occurs, the fact is notified to the notification unit 25, and the control signal is outputted to the engine ECU 22 and the brake ECU 23 as necessary. As such, when a hydroplaning phenomenon occurs, the fact is notified to the user via the notification unit 25. Therefore, the driver can take appropriate measures such as decelerating the vehicle based on the notification by the notification unit 25. Moreover, it is possible to improve the stability of the vehicle even if the driver cannot instantaneously respond to the hydroplaning phenomenon by lowering the engine output or lowering the braking force as necessary.

In the present embodiment, assuming that the absolute values of the first peak value and the second peak value are substantially equal, the determination threshold Th used in steps S210 and S220 has the same value, but the determination threshold Th used in steps S210 and S220 may have different values. In this case, the relationship between the vehicle speed and the determination threshold corresponding to the first peak value, and the relationship between the vehicle speed and the determination threshold corresponding to the second peak value are stored in the receiver 21, and each determination threshold is set based on the vehicle speed indicated by the vehicle speed information. In the present embodiment, the hydroplaning phenomenon is determined to occur if an affirmative determination is made in either one of steps S210 and S220. However, the hydroplaning phenomenon may be determined to occur only when the affirmative determinations are made in both steps S210 and S220. Of course, it is not necessary to execute both steps S210 and S220, and it may be determined whether a hydroplaning phenomenon has occurred by executing only one of steps S210 and S220.

Then, the process proceeds to step S240, and instructs the vehicle communication unit 24 to transmit data indicating that the road surface condition is the wet condition. At this time, if it is determined in step S230 that a hydroplaning phenomenon has occurred, at the same time, the occurrence of the hydroplaning phenomenon is also included in the transmission data from the vehicle communication unit 24. In this manner, the communication center 200 collects information concerning the road surface condition and the occurrence of the hydroplaning phenomenon transmitted from the vehicle, converts the information to the data, and manages the data with respect to each road of the map data. The communication center 200 transmits the managed data to the vehicle. Therefore, the vehicles can share the information concerning the road surface condition and the occurrence of the hydroplaning phenomenon with respect to the road scheduled to be traveled.

As described above, in the hydroplaning determination device 100 of the present embodiment, when the road surface condition is determined as the wet condition based on the vibration data of the tire mount sensor 1, the determination whether the hydroplaning phenomenon has occurred is performed. Specifically, the determination whether the hydroplaning phenomenon has occurred is performed based on the fact that the waveforms of the acceleration sensor 11 at the contact start time and the contact end time of the tire mount sensor 1 vary according to the occurrence of the hydroplaning phenomenon. As a result, occurrence of a hydroplaning phenomenon in a vehicle can be determined.

Second Embodiment

A second embodiment will be described. In the present embodiment, a method for determining the occurrence of the hydroplaning phenomenon is different from the first embodiment. Since the other parts are similar to the first embodiment, parts difference from the first embodiment will be described.

In the present embodiment, the hydroplaning determination device 100, which has similar configuration as the first embodiment, determines whether a hydroplaning phenomenon has occurred based on the vehicle speed, the wheel speed, and the engine speed.

Figure 9:
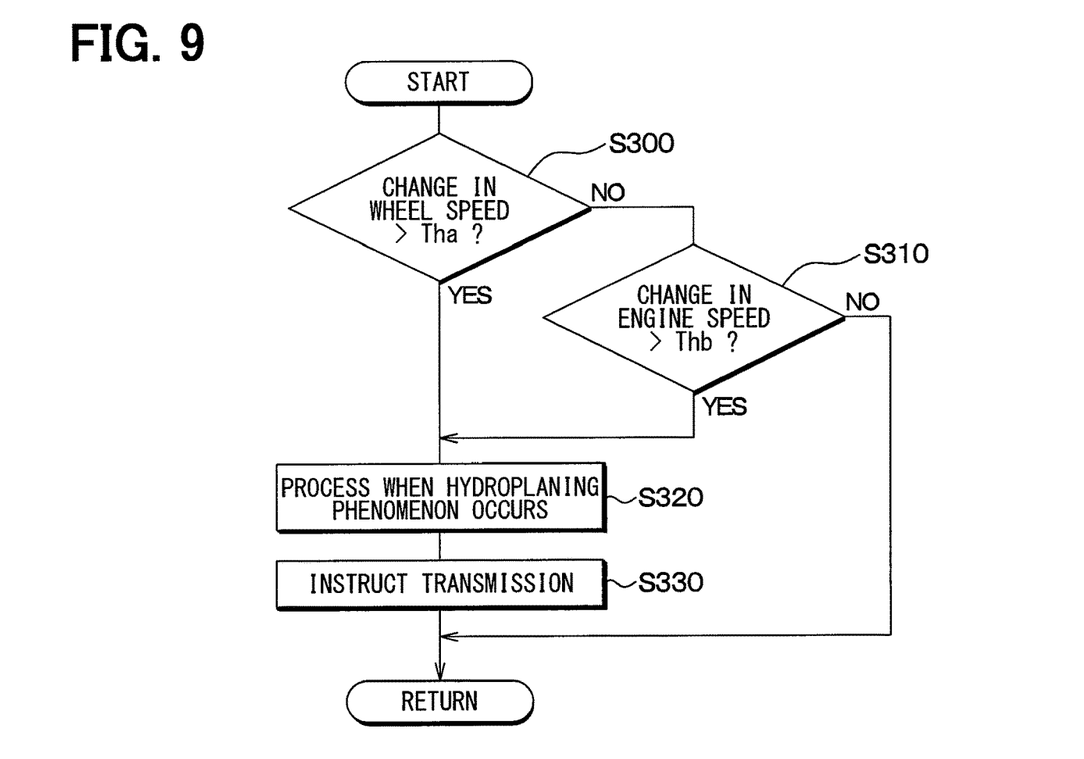
FIG. 9 is a flowchart showing details of a hydroplaning determination process.

Specifically, as the hydroplaning determination processing shown in step S120 of FIG. 6, the processing shown in FIG. 9 is executed instead of the processing shown in FIG. 7.

When the hydroplaning phenomenon occurs, the wheels are in a state of slipping. In this case, the amount of change in the wheel speed is larger than in the normal grip state. Likewise, since the wheels spins free, the engine speed is also higher than in the grip state. Therefore, in step S300, it is determined whether the change amount of the wheel speed exceeds the predetermined threshold Tha. In step S310, it is determined whether the change amount of the engine speed exceeds the predetermined threshold Thb. The wheel speed can be obtained from the wheel speed information from the brake ECU 23. The engine speed can be obtained from the information concerning the engine speed from the engine ECU 22.

In case an affirmative determination is made in either one of steps S300 and S310, the process proceeds to step S320 to determine that a hydroplaning phenomenon is occurring. Similarly to the step S230 in FIG. 7, as a process when the hydroplaning phenomenon occurs, the fact is notified to the notification unit 25, and the control signal is outputted to the engine ECU 22 and the brake ECU 23 as necessary. As such, when a hydroplaning phenomenon occurs, the fact is notified to the user via the notification unit 25. Therefore, the driver can take appropriate measures such as decelerating the vehicle based on the notification by the notification unit 25. Moreover, it is possible to improve the stability of the vehicle even if the driver cannot instantaneously respond to the hydroplaning phenomenon by lowering the engine output or lowering the braking force as necessary. Then, the process proceeds to step S330, and similar processing to the step S240 in FIG. 7 is performed. For example, the vehicle communication unit 24 is instructed to transmit data indicating that the road surface condition is the wet condition.

As described above, when the road surface condition is determined as the wet condition, the occurrence of the hydroplaning phenomenon is determined based on the amount of change in the subsequent wheel speed or engine speed. As such, similar effects to the first embodiment are achieved.

In the present embodiment, the amount of change in the wheel speed is used. However, since it is only necessary to check the slip of the wheel, the occurrence of the hydroplaning phenomenon may be determined based on a change in a slip ratio that is represented by a deviation between the vehicle speed and the wheel speed. In the present embodiment, the hydroplaning phenomenon is determined to occur if an affirmative determination is made in either one of steps S300 and S310. However, the hydroplaning phenomenon may be determined to occur only when the affirmative determinations are made in both steps S300 and S310. Of course, it is not necessary to execute both steps S300 and S310, and the occurrence of the hydroplaning phenomenon may be determined by executing only one of steps S300 and S310.

Other Embodiments

Although the present disclosure is described based on the above embodiments, the present disclosure is not limited to the embodiments. Various changes and modifications may be made in the present disclosure. Furthermore, various combination and formation, and other combination and formation including one, more than one or less than one element may be made in the present disclosure.

For example, the first embodiment and the second embodiment described above are not independent each other and may be combined. For example, as the determination of the occurrence of the hydroplaning phenomenon, the methods described in the first embodiment and the second embodiment may be combined. For example, all the processing of steps S200, S210, S300, and S310 may be performed, and the occurrence of the hydroplaning phenomenon may be determined when an affirmative determination is made in any one or a plurality of steps.

In the above embodiments, the receiver 21 functions as a control unit that determines the occurrence of the hydroplaning phenomenon, or gives a notification instruction to the notification unit 25. However, these are only examples, and a control unit may be provided separately from the receiver 21, or another ECU such as the engine ECU 22 or the brake ECU 23 may function as the control unit.

In the above embodiments, the acceleration sensor 11 is exemplified as a vibration detection unit, and the detection signal of the acceleration sensor 11 is used for determining the occurrence of the hydroplaning phenomenon. However, this is merely an example of the vibration detection unit, and the vibration detection unit may be configured by a device that performs vibration detection other than the acceleration sensor 11. For example, the vibration detection unit may be configured by a piezoelectric element that generates an output voltage corresponding to the applied vibration as the detection signal.

Further, in the above embodiments, as an example of the vehicle motion control when the hydroplaning phenomenon occurs, the engine output is reduced or the braking force is reduced. However, other vehicle motion control may be performed. For example, vehicle steering control limiting the amount of change in the steering angle with respect to the steering operation by the driver may be performed to provide the vehicle motion control such as avoiding spinning of the vehicle.

What is claimed is:

1. A hydroplaning determination device that determines occurrence of a hydroplaning phenomenon in a vehicle, the hydroplaning determination device comprising:
   a tire mount sensor attached to a rear surface of a tire provided on the vehicle, and configured to:
      generate a detection signal according to a magnitude of vibration of the tire;
      generate a vibration data based on the detection signal; and
      transmit the vibration data; and
   a vehicle body system including a receiver that is disposed in a vehicle body area, wherein
      the receiver is configured to:
         receive the vibration data transmitted from the tire mount sensor;
         determine, based on the vibration data, that a road surface condition is a wet condition in which a water film exists between the tire and a road surface;
         determine, based on the vibration data, that a hydroplaning phenomenon has occurred when the receiver determines that the road surface condition is the wet condition; and
         acquire a vehicle speed which is a speed of the vehicle, a time point when a portion of the tire corresponding to a position of the tire mount sensor contacts the road surface is defined as a contact start time, a time point when the portion of the tire is separated from the road surface is defined as a contact end time, the vibration data, which is generated by the tire mount sensor, includes data of at least one of peak waveforms generated in the detection signal at the contact start time and the contact end time, and the receiver is further configured to determine that the hydroplaning phenomenon has occurred when an absolute value of a peak value indicated by the data of the peak waveform included in the vibration data is smaller than a determination threshold corresponding to the vehicle speed acquired by the receiver.

2. The hydroplaning determination device according to claim 1, wherein the vibration data, which is generated by the tire mount sensor, includes data of both of peak waveforms generated in the detection signal at the contact start time and the contact end time, and the receiver is further configured to determine that the hydroplaning phenomenon has occurred, in at least one of situations where:

an absolute value of a peak value indicated by the data of the peak waveform at the contact start time included in the vibration data is smaller than a first determination threshold corresponding to the vehicle speed acquired by the receiver; and an absolute value of a peak value indicated by the data of the peak waveform at the contact end time included in the vibration data is smaller than a second determination threshold corresponding to the vehicle speed.

3. The hydroplaning determination device according to claim 1, wherein the vehicle body system is configured to acquire a wheel speed, which is a speed of a wheel provided on the vehicle, and the receiver is further configured to determine that the hydroplaning phenomenon has occurred when a change amount of the wheel speed acquired by the vehicle body system exceeds a predetermined threshold.

4. The hydroplaning determination device according to claim 1, wherein the vehicle body system is configured to detect a rotation speed of an engine provided in the vehicle, and the receiver is configured to determine that the hydroplaning phenomenon has occurred when a change amount of the rotation speed of the engine acquired by the vehicle body system exceeds a predetermined threshold.

5. The hydroplaning determination device according to claim 1, wherein the determination threshold is directly proportional to the vehicle speed.

6. The hydroplaning determination device according to claim 1, wherein the receiver is further configured to store a relationship between the vehicle speed and the determination threshold corresponding to the peak value.

7. The hydroplaning determination device according to claim 1, wherein the vehicle body system further includes an engine ECU and a brake ECU, and the receiver is further configured to instruct the engine ECU to lower an engine output and to instruct the brake ECU to lower a brake force, in response to determining that the hydroplaning phenomenon has occurred.

8. The hydroplaning determination device according to claim 1, wherein the vehicle body system further includes a notification device, the receiver is further configured to output a hydroplaning notification signal in response to determining that the hydroplaning phenomenon has occurred, and the notification device is configured to receive the hydroplaning notification signal from the receiver, and in response to receiving the hydroplaning notification signal, output at least one of an audio notification that the hydroplaning phenomenon has occurred and a video notification that the hydroplaning phenomenon has occurred.

9. A hydroplaning determination device that determines hydroplaning of a vehicle, the hydroplaning determination device comprising:

a tire mount sensor for mounting to a rear surface of a tire provided on the vehicle, the tire mount sensor configured to:

generate a detection signal according to a magnitude of vibration of the tire;

generate vibration data based on the detection signal; and transmit the vibration data; and a vehicle body system including a receiver and a control unit, the vehicle body system configured to:

receive the vibration data transmitted from the tire mount sensor;

determine, based on the vibration data, that a water film exists between the tire and a road surface;

determine, based on the vibration data, that hydroplaning has occurred, in response to the water film existing between the tire and the road surface; and acquire a speed of the vehicle, a time point when a portion of the tire corresponding to a mounting position of the tire mount sensor contacts the road surface is defined as a contact start time, a time point when the portion of the tire corresponding to the mounting position of the tire mount sensor separates from the road surface is defined as a contact end time, the vibration data includes data related to one peak waveform in the detection signal at the contact start time and data related to one peak waveform in the detection signal at the contact end time, and the receiver is further configured to determine that hydroplaning has occurred in response to (i) an absolute value of a peak value of the one peak waveform in the detection signal at the contact start time being less than a determination threshold, or (ii) an absolute value of a peak value of the one peak waveform in the detection signal at the contact end time being less than the determination threshold.

* * * * *